(12) United States Patent
Schultz et al.

(10) Patent No.: US 8,649,947 B2
(45) Date of Patent: Feb. 11, 2014

(54) TORQUE TRANSFER MECHANISM AND METHOD FOR CONTROLLING IN A VEHICLE LAUNCH OPERATION

(75) Inventors: John C. Schultz, Saline, MI (US); Hamid Vahabzadeh, Oakland, MI (US); Vijay A. Neelakantan, Rochester Hills, MI (US); Daryl A. Wilton, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 205 days.

(21) Appl. No.: 13/308,171

(22) Filed: Nov. 30, 2011

(65) Prior Publication Data

US 2013/0138306 A1    May 30, 2013

(51) Int. Cl.
*G06F 7/00* (2006.01)
*B60W 10/04* (2006.01)
*B60W 10/00* (2006.01)

(52) U.S. Cl.
USPC .......... 701/51; 701/53; 701/67; 477/34; 477/70

(58) Field of Classification Search
None
See application file for complete search history.

(56) References Cited

U.S. PATENT DOCUMENTS

| 7,556,120 B2* | 7/2009 | Sah et al. ............... 180/305 |
| 7,624,853 B2* | 12/2009 | Ekonen et al. ............ 192/84.6 |
| 2004/0186645 A1* | 9/2004 | Kohno et al. ............ 701/51 |
| 2010/0219035 A1* | 9/2010 | Hasewend ............ 192/58.2 |

FOREIGN PATENT DOCUMENTS

DE    3835884 A1 *    4/1990

* cited by examiner

*Primary Examiner* — Helal A Algahaim
*Assistant Examiner* — Kelly E Darby

(57) ABSTRACT

A powertrain for a vehicle is provided having an engine, a transmission, a torque transfer mechanism, a hydraulic fluid circuit, and a transmission control module. The torque transfer mechanism includes a hydraulic fluid pump and is drivingly connected to an output member of the engine and an output member of the torque transfer mechanism is drivingly connected to the input member of the transmission. The hydraulic fluid circuit has a hydraulic valve in communication with the first fluid port of the hydraulic fluid pump. The transmission control module include a control logic for operating the powertrain during a vehicle launch event.

19 Claims, 7 Drawing Sheets

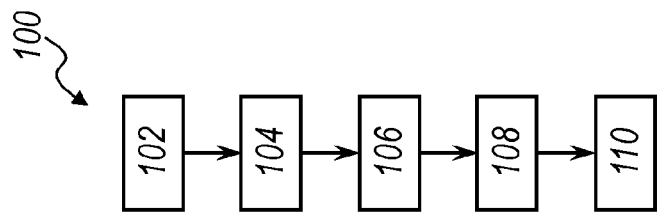
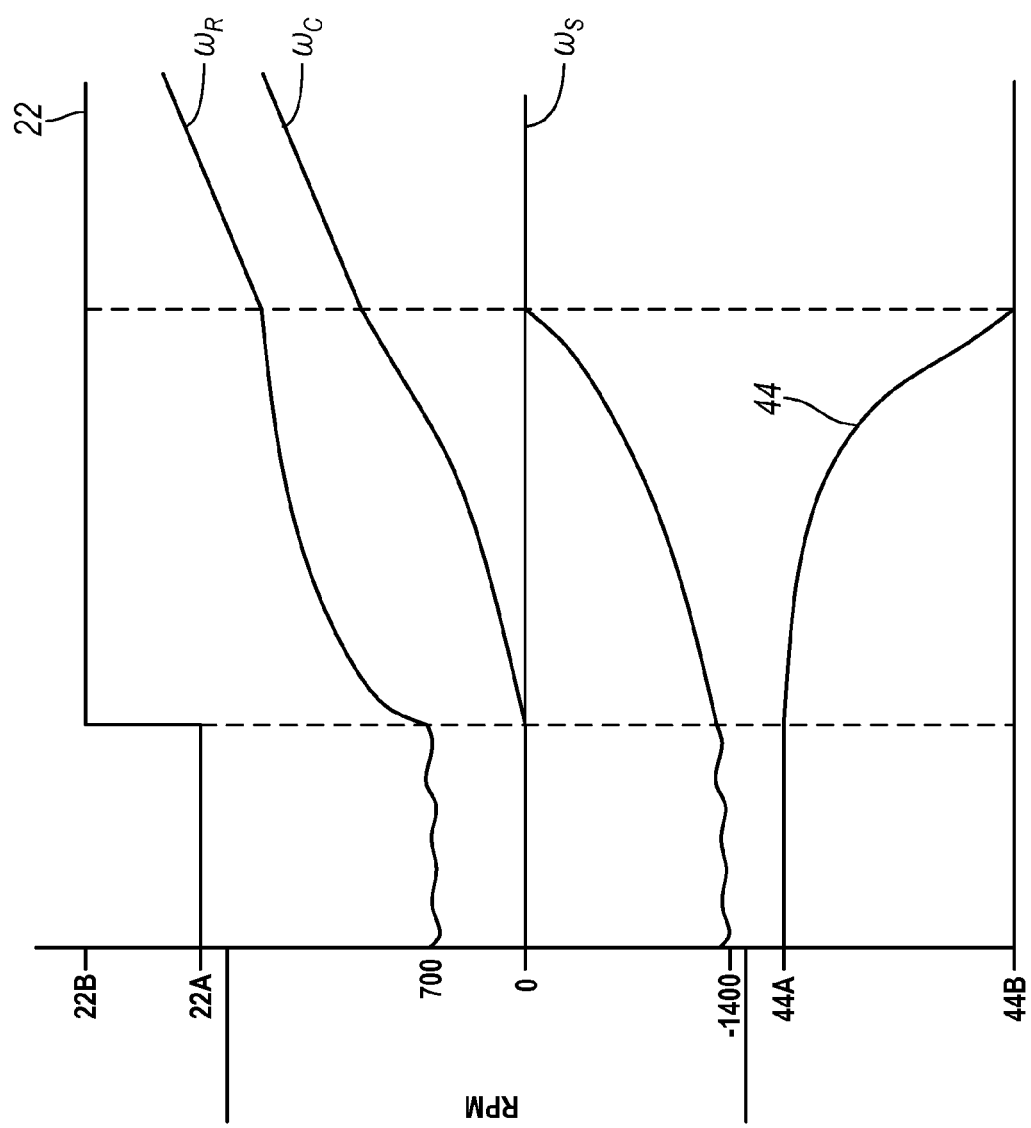

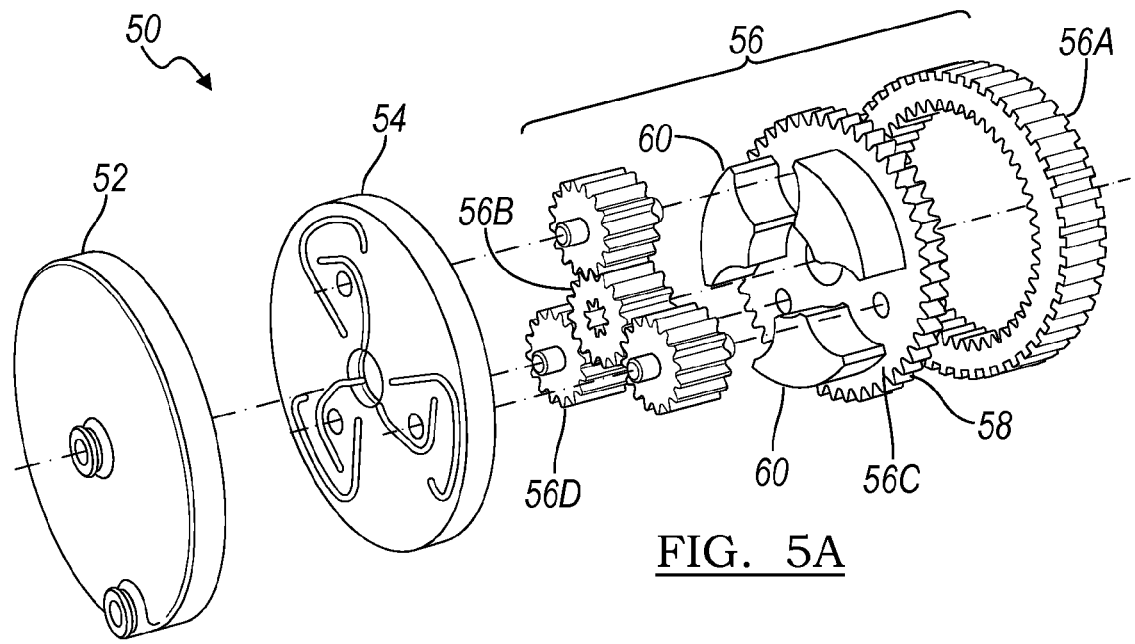
FIG. 5A
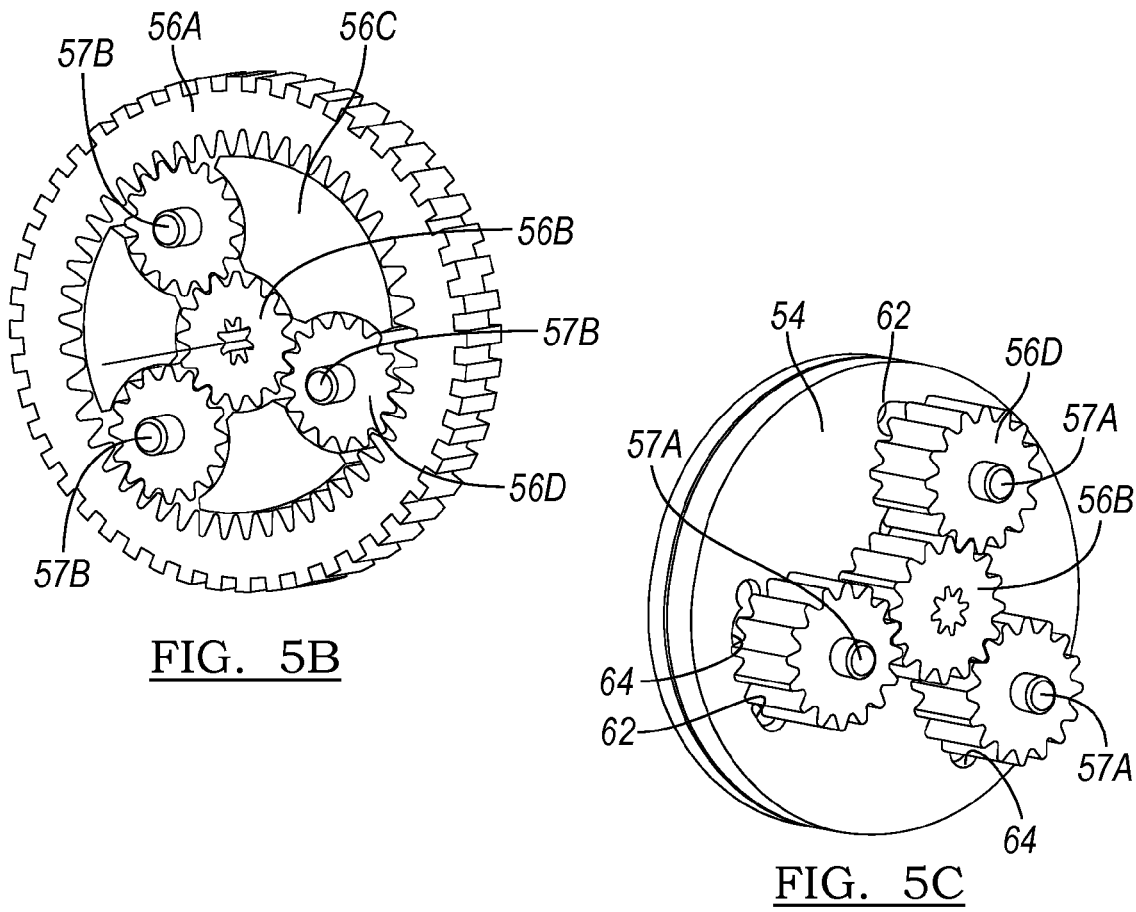
FIG. 5B
FIG. 5C

TORQUE TRANSFER MECHANISM AND METHOD FOR CONTROLLING IN A VEHICLE LAUNCH OPERATION

FIELD

The present invention relates generally to a torque transfer mechanism placed between an engine and transmission of a vehicle and more particularly to a mechanical coupling assembly between an engine output shaft and a transmission input shaft and a method for operating the coupling assembly through a vehicle launch operation.

BACKGROUND

The statements in this section merely provide background information related to the present disclosure and may or may not constitute prior art.

In automatic shifting power transmissions, gear ratio changes are effected by selectively connecting members of planetary gear sets. This is accomplished by selectively engaging torque-transmitting devices such as brakes or clutches. For each gear ratio change, there is a corresponding sequence of off-going clutch disengagement and on-coming clutch engagement. By providing a regulated fluid pressure gain to the clutches, the smooth engagement and disengagement of the clutches may be accomplished.

Additionally, a majority of automatic shifting power transmissions employ a hydrodynamic fluid drive, such as a torque converter or a fluid coupling, between the power source (engine) and a multi-speed gear configuration, such as the planetary gear arrangement discussed above. This hydrodynamic fluid drive will allow the vehicle to come to rest without stalling the engine and will provide a measure of isolation preventing the torsional vibrations, caused by the firing events of the engine, from being transmitted though the powertrain.

However, the traditional use of a torque convertor or other hydrodynamic fluid coupling includes several inefficiencies due to the nature of the fluid dynamic coupling and lack of a mechanical coupling between the engine output and the transmission input. Such mechanical couplings provide direct mechanical linkage between the engine output and the transmission input as in a manual transmission employing a driver engaged clutch. However, manual clutches do not provide as comfortable of an operating experience for many drivers.

SUMMARY

A powertrain for a vehicle is provided having an engine, a transmission, a torque transfer mechanism, a hydraulic fluid circuit, and a transmission control module. The engine has a throttle valve and an output member. The transmission has an input member and at least a first set of gears corresponding to a first gear ratio. The torque transfer mechanism includes a hydraulic fluid pump, an input member, and an output member. The hydraulic fluid pump includes a first fluid port and a second fluid port. The input member of the torque transfer mechanism is drivingly connected to the output member of the engine. The output member of the torque transfer mechanism is drivingly connected to the input member of the transmission. The hydraulic fluid circuit has a hydraulic valve in communication with the first fluid port of the hydraulic fluid pump. The transmission control module is in electrical communication with each of the throttle valve of the engine, the hydraulic valve, and the one-way clutch. The transmission control module includes a first control logic for determining the rotational speed of the input member of the transmission, the rotational speed of the output member of the engine, which gear ratio the transmission is engaged, and the position of the throttle valve. A second control logic opens the hydraulic valve when the rotational speed of the input member of the transmission is zero, the rotational speed of the output member of the engine is at an idle speed, the transmission is engaged in first gear, and the throttle valve is in an open position. A third control logic receives a signal from the throttle valve indicating the opening of the throttle valve. A fourth control logic sends a signal to the hydraulic valve to start closing. A fifth control logic for sends a signal the hydraulic valve to follow a profile for closing the hydraulic valve. A sixth control logic sends a signal the hydraulic valve to close completely to a closed position.

In another example of the present invention, the torque transmitting mechanism further includes a planetary gear set. The planetary gear set has a first member drivingly connected to the hydraulic fluid pump, a second member drivingly connected to the input member of the torque transfer mechanism, and a third member drivingly connected with the output of the torque transfer mechanism.

In yet another example of the present invention, the torque transfer mechanism further includes a one-way clutch drivingly connected to the first member of the planetary gear set wherein the one-way clutch selectably connects the first member to a stationary member.

In yet another example of the present invention, the first member is a sun gear, the second member is a ring gear, and the third member is a carrier member.

In yet another example of the present invention, the hydraulic fluid pump is a rotary gear pump.

In yet another example of the present invention, the hydraulic fluid pump is a rotary vane pump.

In yet another example of the present invention, the hydraulic fluid pump is a piston pump.

In yet another example of the present invention, the hydraulic fluid pump includes cover member, a port member, and a first, a second, and a third member, wherein the first member is drivingly connected to the input member of the torque transfer mechanism and the second member is connected to the output member of the torque transmitting mechanism.

In yet another example of the present invention, the first member is a ring gear, the second member is a carrier member, and the third member is a sun gear, wherein the carrier member rotatably supports a plurality of pinion gears that intermesh with each of the ring gear member and the sun gear member and the carrier member includes a pump body portion having a plurality of arcuate portions each disposed between the pinion gears.

In yet another example of the present invention, the port member has a first side adjacent to the pinion gears and a second side adjacent the cover member. The port member includes a first and a second plurality of cavities, a first and a second plurality of channels, and a central hub cavity. Each of the first plurality of cavities is disposed on the first side of the port member proximate to each of a meshing point between each of the plurality of pinions and the sun gear member. Each of the second plurality of cavities is disposed on the first side of the port member proximate to each of an unmeshing point between each of the plurality of pinions and the sun gear member. The first plurality of channels is disposed on the second side of the port member and in fluid communication with each of the first plurality of cavities through a first plurality of axial ports. The second plurality of channels is disposed on the second side of the port member, in fluid communication with each of the second plurality of cavities through a second plurality of axial ports, and in fluid communication with each other of the second plurality of channels through a central hub cavity disposed on the second side at the axial center of the port member. The cover member has a first side adjacent to the second side of the port member and a second side, the cover member having a first periphery channel, a first fluid port, and a second fluid port. The first periphery channel is disposed at the perimeter of the first side of the cover member. The first periphery channel is in communication with each of the first plurality of channels of the second side of the port member and the first fluid port of the port member. The second fluid port is in communication with the central hub cavity of the second side of the port member. The first fluid port of the cover member is in communication with the hydraulic valve of the hydraulic fluid circuit.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way;

FIG. 2 is a graph depicting the execution of a control logic and its effect in the powertrain;

FIG. 3 is a flowchart of a method of operating the powertrain;

FIG. 5A is a exploded perspective view of a hydraulic planetary gear set;

FIG. 5B is a perspective view of a ring gear, a carrier member, and pinions gears of a hydraulic planetary gear set;

FIG. 5C is a perspective view of a set of pinion gears and a port plate of a hydraulic planetary gear set;

DETAILED DESCRIPTION

The following description is merely exemplary in nature and is not intended to limit the present disclosure, application, or uses.

Figure 1:
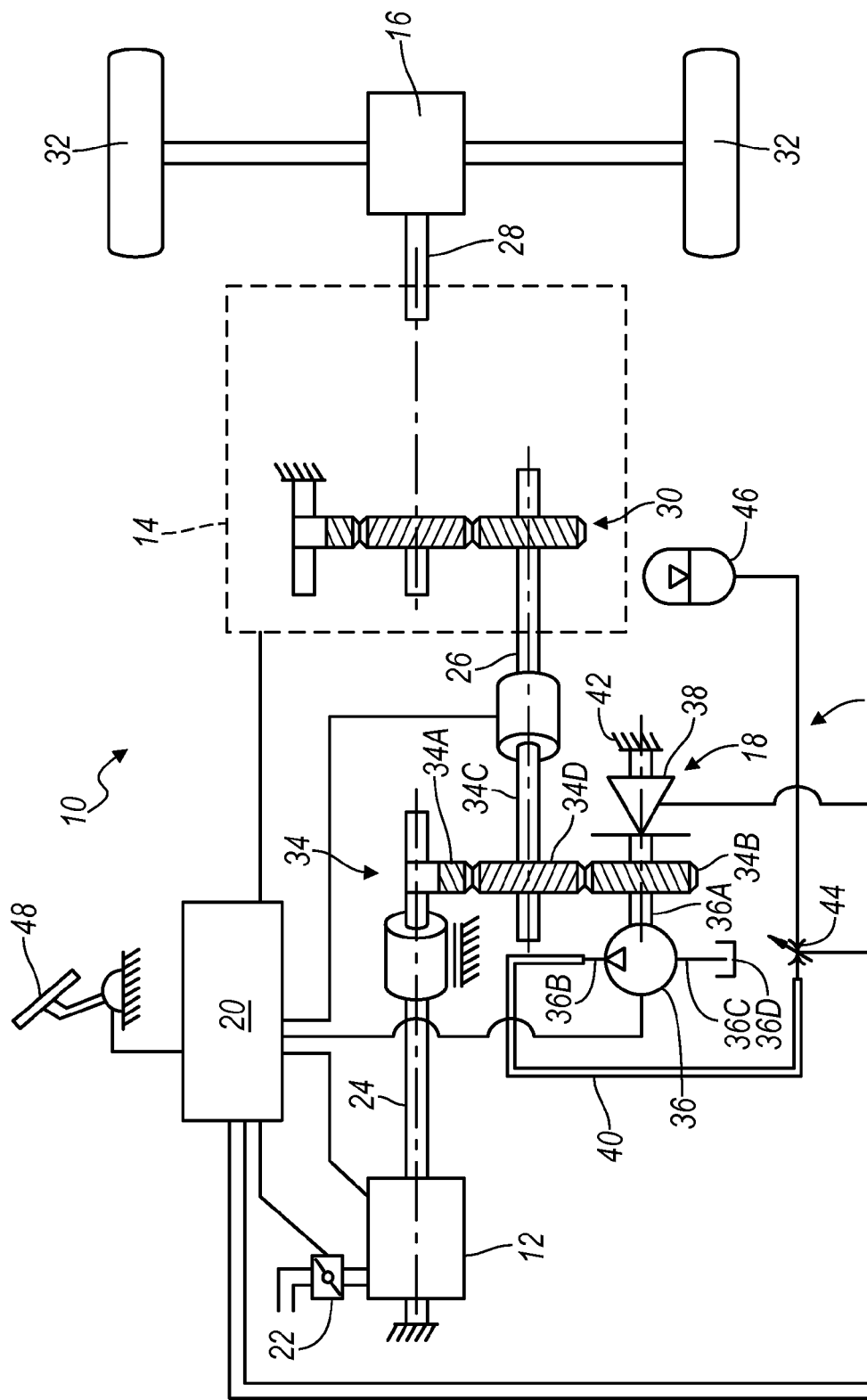
FIG. 1 is a schematic diagram of a powertrain including a torque transferring assembly.

Referring to the drawings, wherein like reference numbers refer to like components, in FIG. 1 a vehicle powertrain 10 is illustrated. The powertrain includes an engine 12, a transmission 14, a driveshaft and differential 16, a torque transfer mechanism 18, and a transmission control module (TCM) 20. In a preferred embodiment of the present invention, the engine 12 is an internal combustion engine, however, other types of torque producing mechanisms may be used without departing from the scope of the present embodiment. The engine 12 includes a throttle valve 22, an output shaft or member 24, and produces an engine torque output t1. The transmission 14 includes an input shaft or member 26, an output shaft or member 28, and at least one gear ratio between the input shaft or member 26 and the output shaft or member 28 derived, in this embodiment, from a planetary gear set 30. A multiple gear ratio transmission is also contemplated without departing from the scope of the present embodiment. The output shaft or member 28 of the transmission 14 is coupled to drive wheels 32 in one of several conventional ways. For example, the output shaft or member 28 is connected to the differential 16 to transfer a transmission torque output t2 to the differential 16 and drive wheels 32.

The torque transfer mechanism 18 is disposed between the output shaft or member 24 of the engine 12 and the input shaft or member 26 of the transmission 14. More specifically, the torque transfer mechanism 18 includes a planetary gear set 34, a hydraulic fluid pump 36, a one-way clutch 38, and a hydraulic circuit 40. The planetary gear set 34 includes a ring gear member 34A, a sun gear member 34B and a carrier member 34C rotatably supporting a plurality of pinions 34D. The ring gear member 34A is interconnected for common rotation with the output shaft or member 24 of the engine 12. The sun gear member 34B is interconnected for common rotation with a torque input member 36A of the hydraulic fluid pump 36 and the one-way clutch 38. The one-way clutch 38 selectably connects the sun gear member 34B to a stationary member 42. The carrier member 34C is interconnected for common rotation with the input shaft or member 26 of the transmission 14. The plurality of pinions 34D intermesh with each of the ring gear member 34A and the sun gear member 34B.

The hydraulic circuit 40 includes a hydraulic valve or node 44 and an accumulator 46 and communicates with a high pressure port 36B of the hydraulic pump 36. The hydraulic pump 36 further includes in low pressure port 36C which draws hydraulic fluid from a sump 36D. However, the pump 36 may also draw from a low pressure portion (not shown) of the hydraulic circuit 40 without departing from the scope of the present embodiment. The output port 36C of the hydraulic pump 36 is in fluid communication with the hydraulic valve or node 44 of the hydraulic circuit 40. The hydraulic valve or node 44 is in fluid communication with the accumulator 46. The hydraulic valve or node 44 controls fluid communication between the high pressure port 36B of the hydraulic pump 36 and the accumulator 46. The hydraulic valve or node 44 is capable of a first or open position 44A, a second or closed position 44B, and a third or partially open position 44C.

The hydraulic pump 36 may be any one of a number of types of hydraulic pumps depending upon the range of pressures required by the amount of torque produced by the engine. For example, for pressure requirements up to 60 bar (approximately 870 psi) a rotary gear pump may be employed. For pressure requirements up to 120 bar (approximately 1.8 Kpsi) a rotary vane pump may be employed. For pressure requirements up to 500 bar (approximately 7.25 Kpsi) an axial or radial piston pump may be used.

The TCM 20 is microprocessor-based, and may be conventional in architecture. The TCM 20 may be paired with an engine control module and even included in a powertrain control module without departing from the scope of the invention. The TCM 20 controls the operation of transmission functions such as clutch engagement and so on depending on the control variables afforded by engine 12, and controls the transmission 14 based on a number of inputs to achieve a desired transmission speed ratio. The TCM 20 generally includes an electronic control device having a preprogrammed digital computer or processor, control logic, memory used to store data, and at least one I/O peripheral. The control logic includes a plurality of logic routines for monitoring, manipulating, and generating data. The control logic may be implemented in hardware, software, or a combination of hardware and software. For example, control logic may be in the form of program code that is stored on the electronic memory storage and engine control unit table by the processor. The TCM 20 is electronically connected to a throttle pedal 48 or an engine or powertrain control module (not shown). The throttle pedal 48 is manipulated by an operator of the vehicle and controls the throttle valve 22 of the engine 12. In typical operation, the engine control module receives a throttle position signal from the throttle pedal 48 and distributes a desired throttle valve position signal to the throttle valve 22 and thus provides the operator control over the amount of air entering the engine 12. The TCM 20 receives the throttle valve position signal from the throttle valve or engine control is also electronically connected to the hydraulic valve or node 44 of the torque transfer mechanism 18, and the transmission 14. The TCM 20 may also be electronically connected to the output shaft or member 24 of the engine 12, the input shaft or member 26 of the transmission 14, and the hydraulic pump 36 to receive rotational speed data from those elements.

The TCM 20 receives input data from the throttle pedal 48, performs the control logic and sends command signals to the throttle valve 22, the transmission 14, and the hydraulic valve or node 44. The throttle valve receives a command signal from the TCM 20 and actuates the throttle valve to allow airflow into the engine. The hydraulic valve or node 44 receives a command signal from the TCM 20 and converts the command signals to hydraulic signals to control the rotation of the hydraulic pump 36. These control signals include, for example, on/off hydraulic signals and a pressure regulation signal.

A control logic may be implemented in software program code that is executable by the processor of the TCM 20 for executing a vehicle launch. For example, such a control logic is initiated when the vehicle is stopped, the engine is rotating at idle speed, the transmission is engaged in a first gear ratio, the throttle pedal 48 is not actuated, the throttle valve is in a closed position 22A, and the hydraulic valve or node 44 is in a first or open position 44A. The effect of the control logic on the vehicle powertrain 10 is represented in FIG. 2. The control logic includes a first control logic for receiving a throttle pedal 48 signal indicating that the operator has actuated the throttle pedal 48. A second control logic receives a signal from the throttle valve 22 indicating that the throttle valve has rotated to an open position 22B and signals the hydraulic valve or node 44 to start closing. The effect of the second control logic includes an increase in engine speed wr and torque output tr, decrease in the hydraulic pump 36, and therefore the sun gear member 34B, rotational speed ws, and increase in the carrier member 34C rotational speed wc, and therefore the input shaft or member 26 of the transmission 14, to a multiple of the engine speed. A third control logic signals the hydraulic valve or node 44 to follow a profile for closing the hydraulic valve or node 44. The effect of the third control logic includes a further decrease in the hydraulic pump 36 rotational speed ws and an increase in the carrier member 34C rotational speed wc to a larger multiple of the engine speed wr. A fourth control logic signals the hydraulic valve or node 44 to close completely to a second or closed position 44B. The effect of the fourth control logic includes a decrease in the rotational speed of the hydraulic pump 36 to zero and an increase in the rotational speed of the carrier member 34C.

Referring now to FIG. 3 with continuing focus on FIG. 2, a flowchart of a method 100 for controlling a transmission executing a launch from an idle stop, in accordance with an example of the present invention will now be described. The steps of the method 100 correspond to the control logic described above employed by the TCU 20. The method begins at block 102 when the vehicle is stopped, the engine is rotating at idle speed, the transmission is engaged in a first gear ratio, the throttle pedal 48 is not actuated, the throttle valve is in a closed position 22A, and the hydraulic valve or node 44 is in a first or open position 44A. In block 104, the TCM 20 receives a throttle pedal 48 signal indicating that the operator has actuated the throttle pedal 48. In block 106, the TCM 20 receives a signal from the throttle valve 22 indicating that the throttle valve has rotated to an open position 22B and signals the hydraulic valve or node 44 to start closing. The effect of the step in block 106 includes an increase in engine speed wr and torque output tr, decrease in the hydraulic pump 36, and therefore the sun gear member 34B, rotational speed ws, and increase in the carrier member 34C rotational speed wc, and therefore the input shaft or member 26 of the transmission 14, to a multiple of the engine speed. In block 108, the TCM signals the hydraulic valve or node 44 to follow a profile for closing the hydraulic valve or node 44. The effect of the step in block 108 includes a further decrease in the hydraulic pump 36 rotational speed ws and an increase in the carrier member 34C rotational speed wc to a higher multiple of the engine speed wr. In block 110, the TCM 20 signals the hydraulic valve or node 44 to close completely to a second or closed position 44B. The effect of the step in block 110 includes a decrease in the rotational speed of the hydraulic pump 36 to zero and an increase in the rotational speed of the carrier member 34C.

Figure 4:
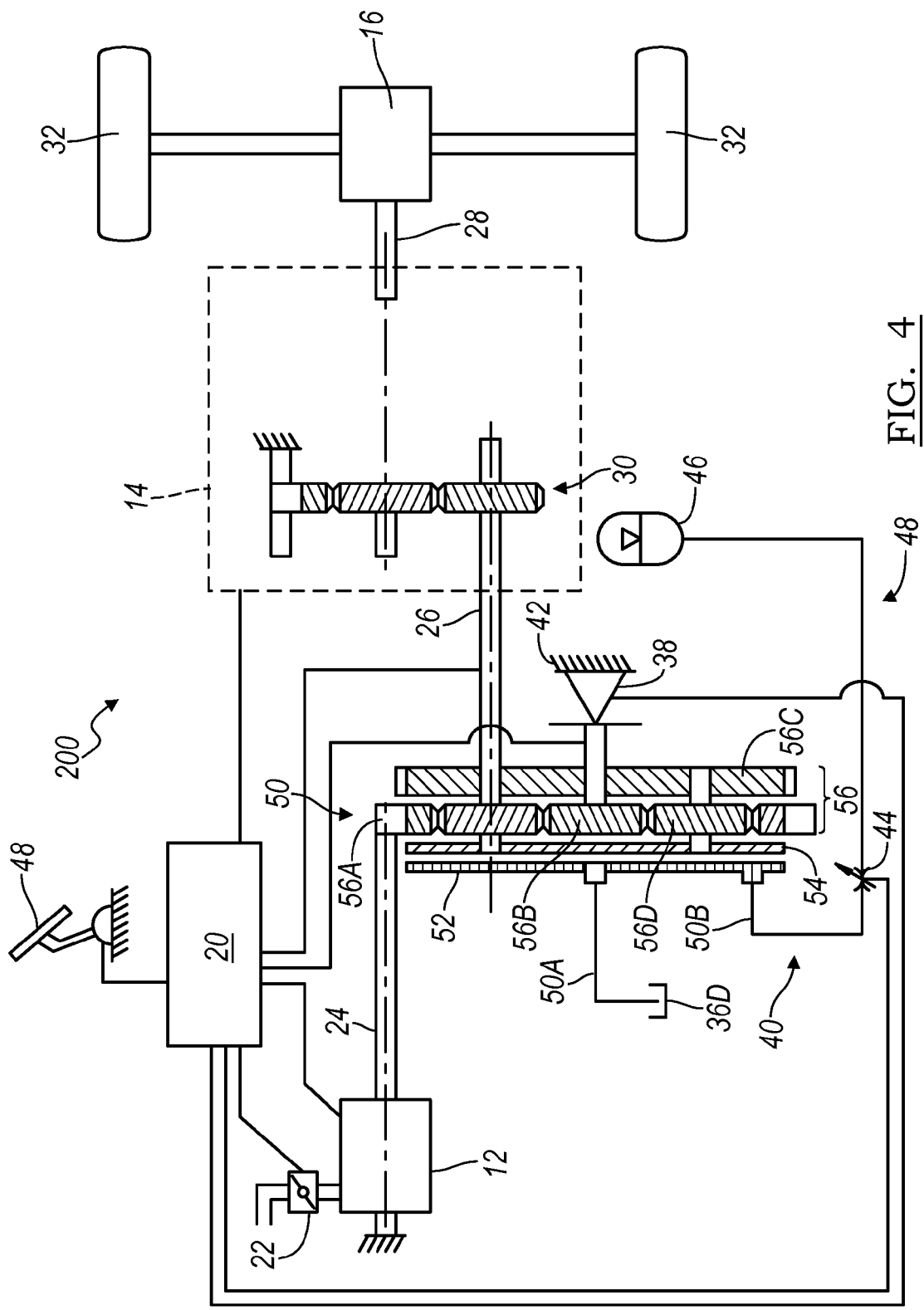
FIG. 4 is a schematic diagram of a powertrain including a torque transferring assembly.

Turning now to FIG. 4, another embodiment of the vehicle powertrain 200 is illustrated and will now be described. In FIG. 4, the reference numbers from FIG. 1 are carried over where possible. The vehicle powertrain 200 includes an engine 12, a transmission 14, a driveshaft and differential 16, a torque transfer mechanism 49, and a TCM 20. More specifically, the torque transfer mechanism 49 includes a hydraulic planetary gear set 50, a one-way clutch 38, and a hydraulic circuit 40. The hydraulic planetary gear set 50 is capable of transferring torque from the output shaft or member 24 of the engine 12 to the input shaft or member 26 of the transmission 14 while selectively producing a high pressure hydraulic fluid flow in the hydraulic circuit 40. For example, the output shaft or member 24 of the engine 12 and the input shaft or member 26 of the transmission are separately rotatably fixed to the hydraulic planetary gear set 50. Further, the hydraulic planetary gear set 50 includes a low pressure port 50A and a high pressure port 50B. The low pressure port 50A draws from a sump 36D while the high pressure port 52B is in communication with the hydraulic circuit 40.

Referring now to FIGS. 5A-5H with continuing reference to FIG. 4, the hydraulic planetary gear set 50 will be described in further detail. The hydraulic planetary gear set 50 includes a cover plate or member 52, a port plate or member 54, and a set of pump gears 56. The port plate or member 54 is located between the cover plate or member 52 and the set of pump gears 56 and is fixed for common rotation with the set of pump gears 56. The set of pump gears 56 includes a ring gear member 56A, a sun gear member 56B, and an integrated pump body carrier member 56C rotatably supporting a plurality of pinion gears 56D. The ring gear member 56A is interconnected for common rotation with the output shaft or member 24 of the engine 12. The sun gear member 56B is interconnected for common rotation with the one-way clutch 38. The one-way clutch 38 selectably connects the sun gear member 56B to a stationary member 42. The pump body carrier member 56C is interconnected for common rotation with the input shaft or member 26 of the transmission 14. The plurality of pinions 56D intermesh with each of the ring gear member 56A and the sun gear member 56B.

Figure 5D:
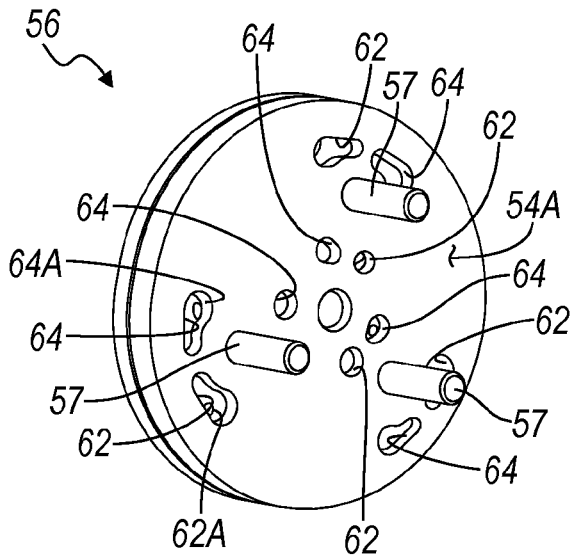
FIG. 5D is a perspective view of a port plate of a hydraulic planetary gear set.
Figure 5E:
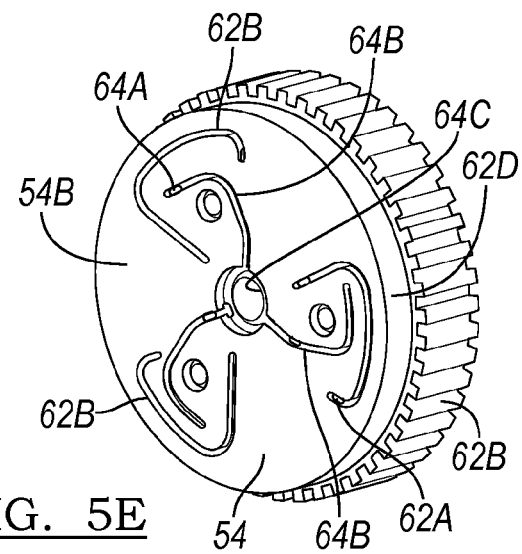
FIG. 5E is a perspective view of a port plate and a ring gear of a hydraulic planetary gear set.
Figure 5F:
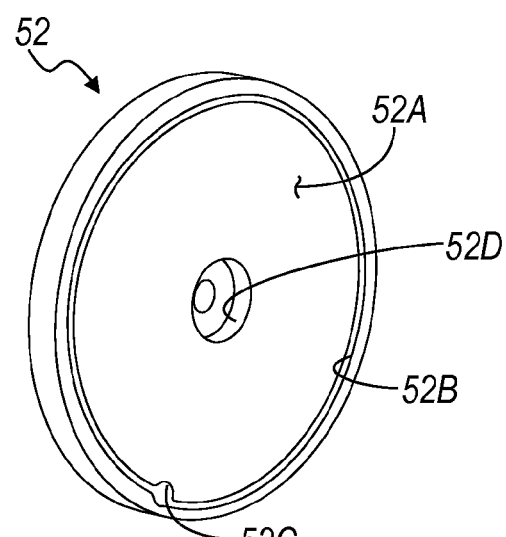
FIG. 5F is a perspective view of a cover plate of a hydraulic planetary gear set.
Figure 5G:
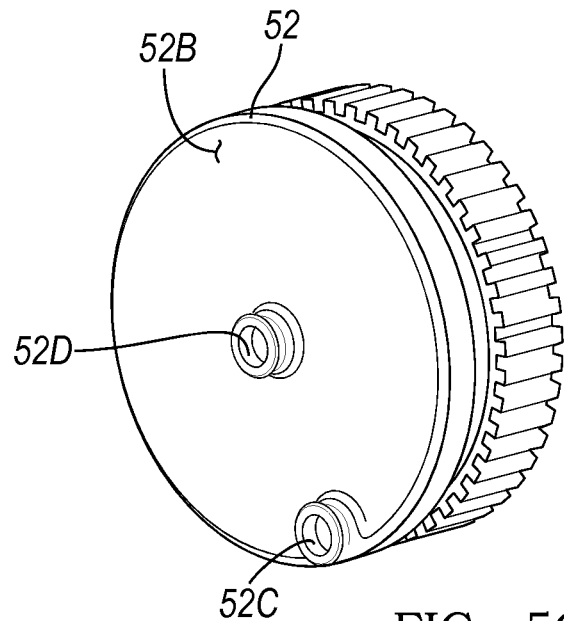
FIG. 5G is a perspective view of a hydraulic planetary gear set.
Figure 5H:
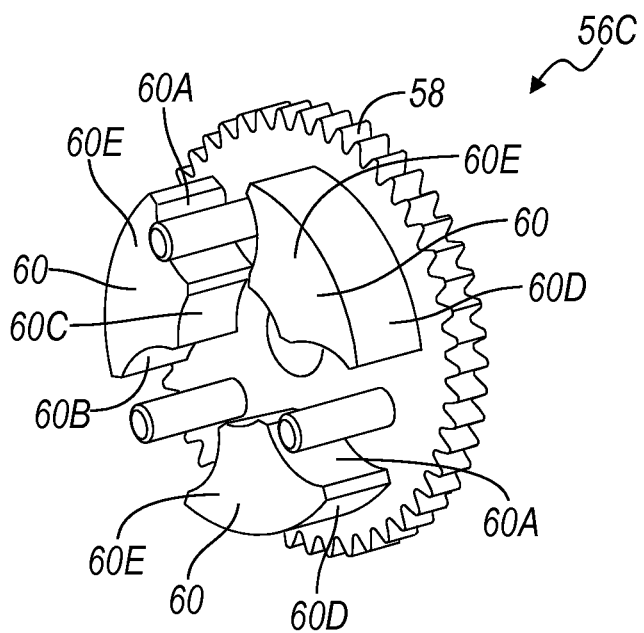
FIG. 5H is a perspective view of a carrier member of a hydraulic planetary gear set.

Focusing now on FIG. 5H, the pump body carrier member 56C of the set of pump gears 56 includes a carrier portion 58 and a plurality of pump body portions 60. The carrier portion 58 rotatably supports the plurality of pinions 56D at a first end 57A of each of the plurality of pinion pins 57. Each of the plurality of pump body portions 60 has four arcuate surfaces extending axially from the carrier portion 58 and a planar surface 60E. A first surface 60A profiles the outer perimeter of one of the plurality of pinion gears 56D and a second surface 60B that profiles the outer perimeter of the next adjacent one of the plurality of pinion gears 56D. A third surface 60C profiles the outer perimeter of the sun gear 56B and joins the first and second surfaces 60A, 60B. Finally, a fourth surface 60D profiles the inner perimeter of the ring gear or member 56A and joins the first and second surfaces 60A, 60B. The planar surface 60E connects the first, second, third, and fourth surfaces 60A-60D and extends radially from the outer perimeter of the sun gear or member 56B to the inner perimeter of the ring gear or member 56A.

Focusing now on FIGS. 5D and 5E, the port plate or member 54 rotatably supports the plurality of pinion pins 57 at a second end 57B of each of the plurality of pinion pins 57. The port plate or member 54 includes a first side 54A adjacent to the pump body carrier member 56C and a second side 54B adjacent to the cover plate or member 52. The first side 54A includes a plurality of high pressure cavities 62 and a plurality of low pressure cavities 64. One of the plurality of high pressure cavities 62 is disposed at each of the meshing points of the sun gear or member 56B and the plurality of pinions 56D and at each of the meshing points of the ring gear or member 56A and the plurality of pinions 56D. One of the plurality of low pressure cavities 64 is disposed at each of the unmeshing points of the sun gear or member 56B and the plurality of pinions 56D and at each of the unmeshing points of the ring gear or member 56A and the plurality of pinions 56D. For example, as the sun gear or member 56B and one of the plurality of pinions 56D rotate, the perspective gear teeth come closer together, forcing any hydraulic fluid between the teeth into the high pressure cavity 62 associated with the particular mesh point. Conversely, as the sun gear or member 56B and one of the plurality of pinions 56D rotate, the perspective gear teeth proximate the unmeshing point separate creating a vacuum which draws fluid in between the gear teeth from the low pressure cavity 64.

Each of the high pressure cavities 62 have an axial port 62A in communication with the second side 54B of the port plate or member 54. The second side 54B of the port plate 54 includes a plurality of high pressure channels 62B, a plurality of low pressure channels 64B, and a low pressure hub cavity 64C. The plurality of high pressure channels 62B communicate with each of the axial ports 62A of the high pressure cavities 62 of the first side 54A of the port plate 54. Likewise, the plurality of low pressure channels 64B communicate with each of the axial ports 64A of the low pressure cavities 64 of the first side 54A of the port plate 54. Each of the plurality of low pressure channels 64B communicate with one another through the low pressure hub cavity 64C disposed at the center of the second side 54B of the port plate 54.

Focusing now on FIGS. 5F and 5G, the cover plate 52 includes a first side 52A and a second side 52B. The first side 52A is disposed adjacent the second side 54B of the port plate 54 and includes a perimeter high pressure channel 52C, a high pressure port 52D and a central low pressure port 52E. The perimeter high pressure channel 52C is in communication with each of the plurality of high pressure channels 62B of the second side 54B of the port plate or member 54. Further, the perimeter high pressure channel 52C is in communication with the high pressure port 52D which in turn is in communication with the high pressure port 50A of the hydraulic planetary gear set 50. The central low pressure port 52E is in communication with the low pressure hub cavity 64C of the second side 54B of the port plate 54 which in also communicates with the low pressure port 50A of the hydraulic planetary gear set 50.

Returning now to FIG. 4, the hydraulic circuit 48 includes a hydraulic valve or node 44 and an accumulator 46 and communicates with an high pressure port 50B of the torque transfer mechanism 50. The low pressure port 50A of the torque transfer mechanism 50 draws hydraulic fluid from a sump 36D. However, torque transfer mechanism 50 may also draw from a low pressure portion (not shown) of the hydraulic circuit 48 without departing from the scope of the present embodiment. The high pressure port 50B of the torque transfer mechanism 50 is in fluid communication with the hydraulic valve or node 44 of the hydraulic circuit 48. The hydraulic valve or node 44 is in fluid communication with the accumulator 46. The hydraulic valve or node 44 controls fluid communication between the high pressure port 50B of the torque transfer mechanism 50 and the accumulator 46. The hydraulic valve or node 44 is capable of a first or open position 44A, a second or closed position 44B, and a third or partially open position 44C.

The TCM 20 is microprocessor-based, and may be conventional in architecture. The powertrain control module 20 may be separated into an engine control module and a transmission control module without departing from the scope of the embodiment. The TCM 20 controls the operation of engine and transmission functions such as fuel parameters, spark timing, and so on depending on the control variables afforded by engine 12, and controls the transmission 14 based on a number of inputs to achieve a desired transmission speed ratio. The TCM 20 generally includes an electronic control device having a preprogrammed digital computer or processor, control logic, memory used to store data, and at least one I/O peripheral. The control logic includes a plurality of logic routines for monitoring, manipulating, and generating data. The control logic may be implemented in hardware, software, or a combination of hardware and software. For example, control logic may be in the form of program code that is stored on the electronic memory storage and engine control unit table by the processor. The TCM 20 is electronically connected to a throttle pedal 48 operated by an operator of the vehicle and the throttle valve 22 of the engine 12. In typical operation, the TCM 20 receives a throttle position signal from the throttle pedal 48 and distributes a desired throttle valve position signal to the throttle valve 22 and thus provides the operator control over the amount of air entering the engine 12. The TCM 20 is also electronically connected to the hydraulic valve or node 44 of the torque transfer mechanism 18, and the transmission 14. The TCM 20 may also be electronically connected to the output shaft or member 24 of the engine 12, the input shaft or member 26 of the transmission 14, and the sun gear member 50B of the hydraulic planetary gear set 50 to receive rotational speed data from those elements.

The TCM 20 receives input data from the throttle pedal 48, performs the control logic and sends command signals to the throttle valve 22, the transmission 14, and the hydraulic valve or node 44. The throttle valve receives a command signal from the TCM 20 and actuates the throttle valve to allow airflow into the engine. The hydraulic valve or node 44 receives a command signal from the TCM 20 and converts the command signals to hydraulic signals to control the rotation of the hydraulic planetary gear set 50. These control signals include, for example, on/off hydraulic signals and a pressure regulation signal.

A control logic may be implemented in software program code that is executable by the processor of the TCM 20 for executing a vehicle launch. For example, such a control logic is initiated when the vehicle is stopped, the engine is rotating at idle speed, the transmission is engaged in a first gear ratio, the throttle pedal 48 is not actuated, the throttle valve is in a closed position 22A, and the hydraulic valve or node 44 is in a first or open position 44A. The control logic includes a first control logic for receiving a throttle pedal 48 signal indicating that the operator has actuated the throttle pedal 48. A second control logic receives a signal from the throttle valve 22 indicating that the throttle valve has rotated to an open position 22B and signals the hydraulic valve or node 44 to start closing. The effect of the second control logic includes an increase in engine speed wr and torque output tr, decrease in the speed ws of the sun gear member 56B of the set of pump gears 56 relative to the pump body carrier member 56C rotational speed wc, and therefore the input shaft or member 26 of the transmission 14. A third control logic signals the hydraulic valve or node 44 to follow a profile for closing the hydraulic valve or node 44. The effect of the third control logic includes a further decrease in speed ws of the sun gear member 56B of the set of pump gears 56 relative to the rotational speed wc of the carrier member 56C set of pump gears 56. A fourth control logic signals the hydraulic valve or node 44 to close completely to a second or closed position 44B. The effect of the fourth control logic includes a further decrease in the rotational speed ws of the sun gear member 56B of the set of pump gears 56 relative to the rotational speed wc of the pump body carrier member 56C of the set of pump gears 56 so that the sun gear member 56B, the ring gear member 56A, and the carrier member 56C of the set of pump gears 56 are rotating at the same speed.

Figure 6:
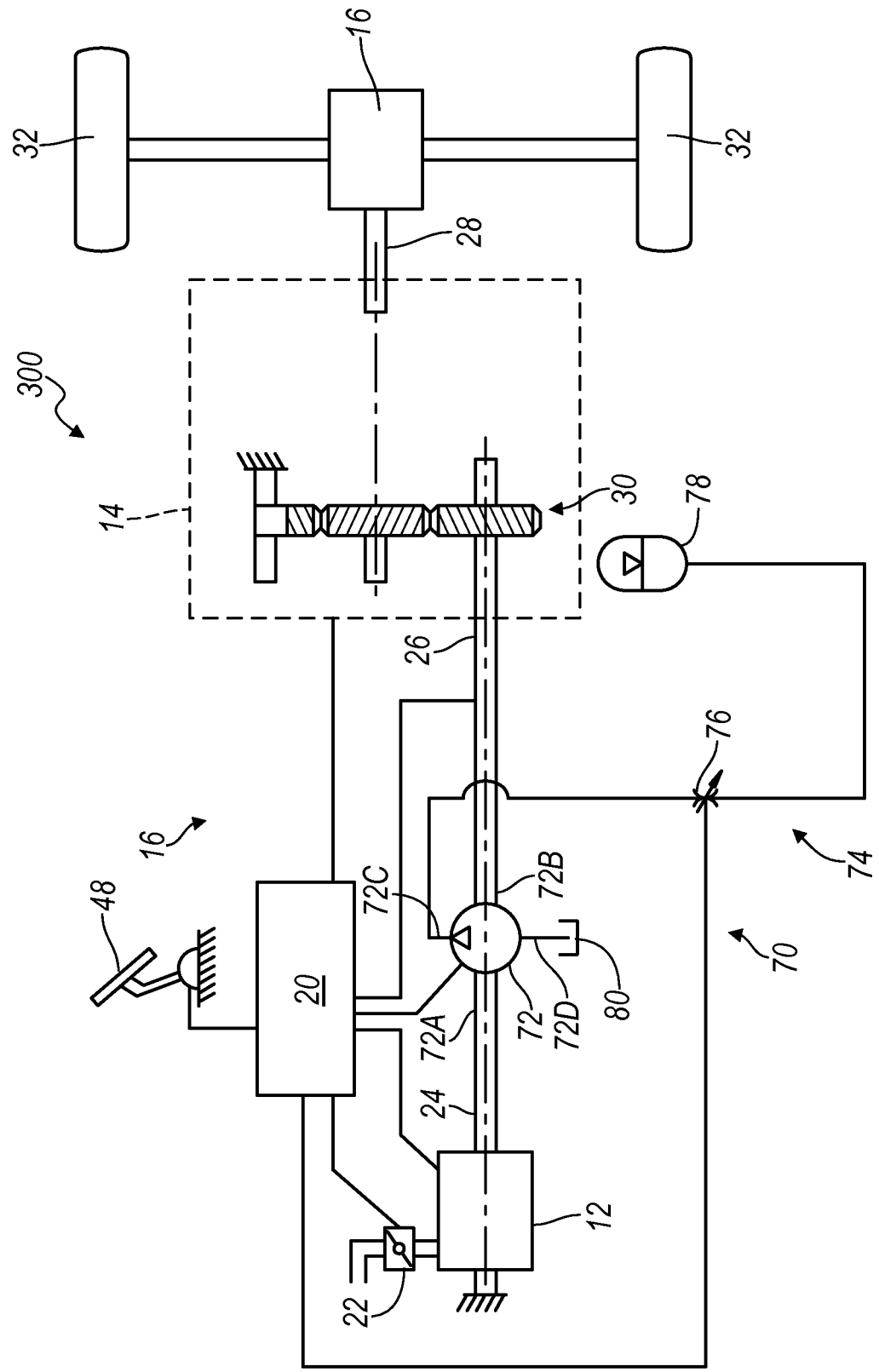
FIG. 6 is a schematic diagram of a powertrain including a torque transferring assembly.

Turning now to FIG. 6, another embodiment of the vehicle powertrain 300 is illustrated and will now be described. In FIG. 6, the reference numbers from FIG. 1 are carried over where possible. The powertrain includes an engine 12, a transmission 14, a driveshaft and differential 16, a torque transfer mechanism 70, and a TCM 20. The engine 12 includes a throttle valve 22, an output shaft or member 24, and produces an engine torque output t1. The transmission 14 includes an input shaft or member 26, an output shaft or member 28, and at least one gear ratio between the input shaft or member 26 and the output shaft or member 28 derived, in this embodiment, from a planetary gear set 30. A multiple gear ratio transmission is also contemplated without departing from the scope of the present embodiment. The output shaft or member 28 of the transmission 14 is coupled to drive wheels 32 in one of several conventional ways. For example, the output shaft or member 28 is connected to the differential 16 to transfer a transmission torque output t2 to the differential 16 and drive wheels 32.

The torque transfer mechanism 70 is disposed between the output shaft or member 24 of the engine 12 and the input shaft or member 26 of the transmission 14. More specifically, the torque transfer mechanism 70 includes a hydraulic fluid pump 72 and a hydraulic circuit 74. A torque input member 72A of the hydraulic fluid pump 72 is interconnected for common rotation with the output shaft or member 24 of the engine 12. A torque output member or the hydraulic fluid pump housing 72B of the hydraulic fluid pump 72 is interconnected for common rotation with the input shaft or member 26 of the transmission 14.

The hydraulic circuit 74 includes a hydraulic valve or node 76 and an accumulator 78 and communicates with a high pressure port 72C of the hydraulic pump 72. The hydraulic pump 72 further includes a low pressure port 72D which draws hydraulic fluid from a sump 80. However, the pump 72 may also draw from a low pressure portion (not shown) of the hydraulic circuit 74 without departing from the scope of the present embodiment. The high pressure port 72C of the hydraulic pump 72 is in fluid communication with the hydraulic valve or node 44 of the hydraulic circuit 74. The hydraulic valve or node 44 is in fluid communication with the accumulator 78. The hydraulic valve or node 44 controls fluid communication between the high pressure port 72C of the hydraulic pump 72 and the accumulator 78. The hydraulic valve or node 44 is capable of a first or open position 44A, a second or closed position 44B, and a third or partially open position 44C.

The transmission control module 20 is microprocessor-based, and may be conventional in architecture. The transmission control module 20 may be separated into an engine control module and a transmission control module without departing from the scope of the embodiment. The TCM 20 controls the operation of engine and transmission functions such as fuel parameters, spark timing, and so on depending on the control variables afforded by engine 12, and controls the transmission 14 based on a number of inputs to achieve a desired transmission speed ratio. The TCM 20 generally includes an electronic control device having a preprogrammed digital computer or processor, control logic, memory used to store data, and at least one I/O peripheral. The control logic includes a plurality of logic routines for monitoring, manipulating, and generating data. The control logic may be implemented in hardware, software, or a combination of hardware and software. For example, control logic may be in the form of program code that is stored on the electronic memory storage and engine control unit table by the processor. The TCM 20 is electronically connected to a throttle pedal 48 operated by an operator of the vehicle and the throttle valve 22 of the engine 12. In typical operation, the TCM 20 receives a throttle position signal from the throttle pedal 48 and distributes a desired throttle valve position signal to the throttle valve 22 and thus provides the operator control over the amount of air entering the engine 12. The TCM 20 is also electronically connected to the hydraulic valve or node 44. The TCM 20 may also be electronically connected to the output shaft or member 24 of the engine 12, the input shaft or member 26 of the transmission 14, and the hydraulic pump 72 to receive rotational speed data from those elements.

The TCM 20 receives input data from the throttle pedal 48, performs the control logic and sends command signals to the throttle valve 22, the transmission 14, and the hydraulic valve or node 44. The throttle valve receives a command signal from the TCM 20 and actuates the throttle valve to allow airflow into the engine. The hydraulic valve or node 44 receives a command signal from the TCM 20 and converts the command signals to hydraulic signals to control the rotation of the hydraulic pump 72. These control signals include, for example, on/off hydraulic signals and a pressure regulation signal.

A control logic may be implemented in software program code that is executable by the processor of the TCM 20 for executing a vehicle launch. This is going to be a different method for this embodiment. For example, the control logic is implemented when the vehicle is stopped, the engine is rotating at idle speed, the transmission is engaged in a first gear ratio, the throttle pedal 48 is not actuated, and the hydraulic valve or node 76 is in a first or open position. The control logic includes a first control logic for receiving a throttle pedal 48 signal indicating that the operator has actuated the throttle pedal 48. A second control logic receives a signal from the throttle valve 22 indicating that the throttle valve 22 has rotated to an open position 22B and signals the hydraulic valve or node 76 to start closing. The effect of the second control logic includes an increase in engine speed and torque output, decrease in rotational speed of the hydraulic pump 72 relative to the transmission input member 26. A third control logic signals the hydraulic valve or node 76 to follow a profile for closing the hydraulic valve or node 76. The effect of the third control logic includes a further decrease in the rotational speed of the hydraulic pump 36 relative to the transmission input member 26. A fourth control logic signals the hydraulic valve or node 76 to close completely. The effect of the fourth control logic includes a decrease in the rotational speed of the hydraulic pump 36 relative to the transmission input member so that the engine output member 24 rotates at the same speed as the transmission input member 26. A further effect of the fourth control logic is the transfer of pressurized hydraulic fluid from the sump 80 to the accumulator 78.

The description of the invention is merely exemplary in nature and variations that do not depart from the gist of the invention are intended to be within the scope of the invention. Such variations are not to be regarded as a departure from the spirit and scope of the invention.

What is claimed is:

1. A powertrain for a vehicle, the powertrain comprising:
an engine having a throttle valve and an output member;
a transmission having an input member and at least a first set of gears corresponding to a first gear ratio;
a torque transfer mechanism including a hydraulic fluid pump, an input member, and an output member, wherein the hydraulic fluid pump includes a first fluid port and a second fluid port, the input member of the torque transfer mechanism is drivingly connected to the output member of the engine, and the output member of the torque transfer mechanism is drivingly connected to the input member of the transmission;
a hydraulic fluid circuit filled with hydraulic fluid, the hydraulic fluid circuit having a hydraulic valve in communication with the first fluid port of the hydraulic fluid pump; and
a transmission control module in electrical communication with each of the throttle valve of the engine, the hydraulic valve, and a one-way clutch, the transmission control module including a control logic, the control logic including:
a first control logic for determining the rotational speed of the input member of the transmission, the rotational speed of the output member of the engine, which gear ratio the transmission is engaged, and the position of the throttle valve;
a second control logic for opening the hydraulic valve when the rotational speed of the input member of the transmission is zero, the rotational speed of the output member of the engine is at an idle speed, the transmission is engaged in first gear, and the throttle valve is in an open position;
a third control logic for receiving a signal from the throttle valve indicating the opening of the throttle valve;
a fourth control logic for sending a signal to the hydraulic valve to start closing;
a fifth control logic for sending a signal to the hydraulic valve to follow a profile for closing the hydraulic valve; and
a sixth control logic for sending a signal to the hydraulic valve to close completely to a closed position.

2. The powertrain of claim 1 wherein the torque transmitting mechanism further includes a planetary gear set, the planetary gear set having a first member drivingly connected to the hydraulic fluid pump, a second member drivingly connected to the input member of the torque transfer mechanism, and a third member drivingly connected with the output of the torque transfer mechanism.

3. The powertrain of claim 2 wherein the torque transfer mechanism further includes a one-way clutch drivingly connected to the first member of the planetary gear set wherein the one-way clutch selectably connects the first member to a stationary member.

4. The powertrain of claim 3 wherein the first member is a sun gear, the second member is a ring gear, and the third member is a carrier member.

5. The vehicle powertrain of claim 1 wherein the hydraulic fluid pump is a rotary gear pump.

6. The vehicle powertrain of claim 1 wherein the hydraulic fluid pump is a rotary vane pump.

7. The vehicle powertrain of claim 1 wherein the hydraulic fluid pump is a piston pump.

8. The vehicle powertrain of claim 1 wherein the hydraulic fluid pump includes cover member, a port member, and a first, a second, and a third member, wherein the first member is drivingly connected to the input member of the torque transfer mechanism and the second member is connected to the output member of the torque transmitting mechanism.

9. The vehicle powertrain of claim 8 wherein the first member is a ring gear, the second member is a carrier member, and the third member is a sun gear, wherein the carrier member rotatably supports a plurality of pinion gears that intermesh with each of the ring gear member and the sun gear member and the carrier member includes a pump body portion having a plurality of arcuate portions each disposed between the pinion gears.

10. The vehicle powertrain of claim 9 wherein the port member has a first side adjacent to the pinion gears and a second side adjacent the cover member, the port member including a first and a second plurality of cavities, a first and a second plurality of channels, and a central hub cavity, and wherein each of the first plurality of cavities is disposed on the first side of the port member proximate to each of a meshing point between each of the plurality of pinions and the sun gear member, each of the second plurality of cavities is disposed on the first side of the port member proximate to each of an unmeshing point between each of the plurality of pinions and the sun gear member, the first plurality of channels is disposed on the second side of the port member and in fluid communication with each of the first plurality of cavities through a first plurality of axial ports, the second plurality of channels is disposed on the second side of the port member, in fluid communication with each of the second plurality of cavities through a second plurality of axial ports, and in fluid communication with each other of the second plurality of channels through a central hub cavity disposed on the second side at the axial center of the port member; and the cover member having a first side adjacent to the second side of the port member and a second side, the cover member having a first periphery channel, a first fluid port, and a second fluid port, and wherein the first periphery channel is disposed at the perimeter of the first side of the cover member, the first periphery channel is in communication with each of the first plurality of channels of the second side of the port member and the first fluid port of the port member, and the second fluid port is in communication with the central hub cavity of the second side of the port member; and wherein the first fluid port of the cover member is in communication with the hydraulic valve of the hydraulic fluid circuit.

11. A powertrain for a vehicle, the powertrain comprising:
an engine having a throttle valve and an output member;
a transmission having an input member and at least a first set of gears corresponding to a first gear ratio;
a torque transfer mechanism including a hydraulic fluid pump and a planetary gear set, wherein the hydraulic fluid pump includes a first fluid port and a second fluid port, the planetary gear set having a first member drivingly connected to the hydraulic fluid pump, a second member drivingly connected to the output member of the engine, and a third member drivingly connected with the input member of the transmission;
a hydraulic fluid circuit filled with hydraulic fluid, the hydraulic fluid circuit having a hydraulic valve in communication with the first fluid port of the hydraulic fluid pump; and
a transmission control module in electrical communication with each of the throttle valve of the engine, the hydraulic valve, and a one-way clutch, the transmission control module including a control logic, the control logic including:
a first control logic for determining the rotational speed of the input member of the transmission, the rotational speed of the output member of the engine, which gear ratio the transmission is engaged, and the position of the throttle valve;
a second control logic for opening the hydraulic valve when the rotational speed of the input member of the transmission is zero, the rotational speed of the output member of the engine is at an idle speed, the transmission is engaged in first gear, and the throttle valve is in an open position;
a third control logic for receiving a signal from the throttle valve indicating the opening of the throttle valve;
a fourth control logic for sending a signal to the hydraulic valve to start closing;
a fifth control logic for sending a signal to the hydraulic valve to follow a profile for closing the hydraulic valve; and
a sixth control logic for sending a signal to the hydraulic valve to close completely to a closed position.

12. The powertrain of claim 11 wherein the torque transfer mechanism further includes a one-way clutch drivingly connected to the first member of the planetary gear set wherein the one-way clutch selectably connects the first member to a stationary member.

13. The powertrain of claim 12 wherein the first member is a sun gear, the second member is a ring gear, and the third member is a carrier member.

14. The vehicle powertrain of claim 11 wherein the hydraulic fluid pump is a rotary gear pump.

15. The vehicle powertrain of claim 11 wherein the hydraulic fluid pump is a rotary vane pump.

16. The vehicle powertrain of claim 11 wherein the hydraulic fluid pump is a piston pump.

17. A powertrain for a vehicle, the powertrain comprising:
an engine having a throttle valve and an output member;
a transmission having an input member and at least a first set of gears corresponding to a first gear ratio;
a torque transfer mechanism including a hydraulic fluid pump, wherein the hydraulic fluid pump includes a first fluid port, a second fluid port, a cover member, a port member, and a first, a second, and a third member, wherein the first member is drivingly connected to the output member of the engine and the second member is drivingly connected to the input member of the transmission;
a hydraulic fluid circuit filled with hydraulic fluid, the hydraulic fluid circuit having a hydraulic valve in communication with the first fluid port of the hydraulic fluid pump; and
a transmission control module in electrical communication with each of the throttle valve of the engine, the hydraulic valve, and a one-way clutch, the transmission control module including a control logic, the control logic including:
a first control logic for determining the rotational speed of the input member of the transmission, the rotational speed of the output member of the engine, which gear ratio the transmission is engaged, and the position of the throttle valve;
a second control logic for opening the hydraulic valve when the rotational speed of the input member of the transmission is zero, the rotational speed of the output member of the engine is at an idle speed, the transmission is engaged in first gear, and the throttle valve is in an open position;
a third control logic for receiving a signal from the throttle valve indicating the opening of the throttle valve;
a fourth control logic for sending a signal to the hydraulic valve to start closing;
a fifth control logic for sending a signal to the hydraulic valve to follow a profile for closing the hydraulic valve; and
a sixth control logic for sending a signal to the hydraulic valve to close completely to a closed position.

18. The vehicle powertrain of claim 17 wherein the first member is a ring gear, the second member is a carrier member, and the third member is a sun gear, wherein the carrier member rotatably supports a plurality of pinion gears that intermesh with each of the ring gear member and the sun gear member and the carrier member includes a pump body portion having a plurality of arcuate portions each disposed between the pinion gears.

19. The vehicle powertrain of claim 18 wherein the port member has a first side adjacent to the pinion gears and a second side adjacent the cover member, the port member including a first and a second plurality of cavities, a first and a second plurality of channels, and a central hub cavity, and wherein each of the first plurality of cavities is disposed on the first side of the port member proximate to each of a meshing point between each of the plurality of pinions and the sun gear member, each of the second plurality of cavities is disposed on the first side of the port member proximate to each of an unmeshing point between each of the plurality of pinions and the sun gear member, the first plurality of channels is disposed on the second side of the port member and in fluid communication with each of the first plurality of cavities through a first plurality of axial ports, the second plurality of channels is disposed on the second side of the port member, in fluid communication with each of the second plurality of cavities through a second plurality of axial ports, and in fluid communication with each other of the second plurality of channels through a central hub cavity disposed on the second side at the axial center of the port member; and the cover member having a first side adjacent to the second side of the port member and a second side, the cover member having a first periphery channel, a first fluid port, and a second fluid port, and wherein the first periphery channel is disposed at the perimeter of the first side of the cover member, the first periphery channel is in communication with each of the first plurality of channels of the second side of the port member and the first fluid port of the port member, and the second fluid port is in communication with the central hub cavity of the second side of the port member; and wherein the first fluid port of the cover member is in communication with the hydraulic valve of the hydraulic fluid circuit.

\* \* \* \* \*